United States Patent Office 3,332,240
Patented July 25, 1967

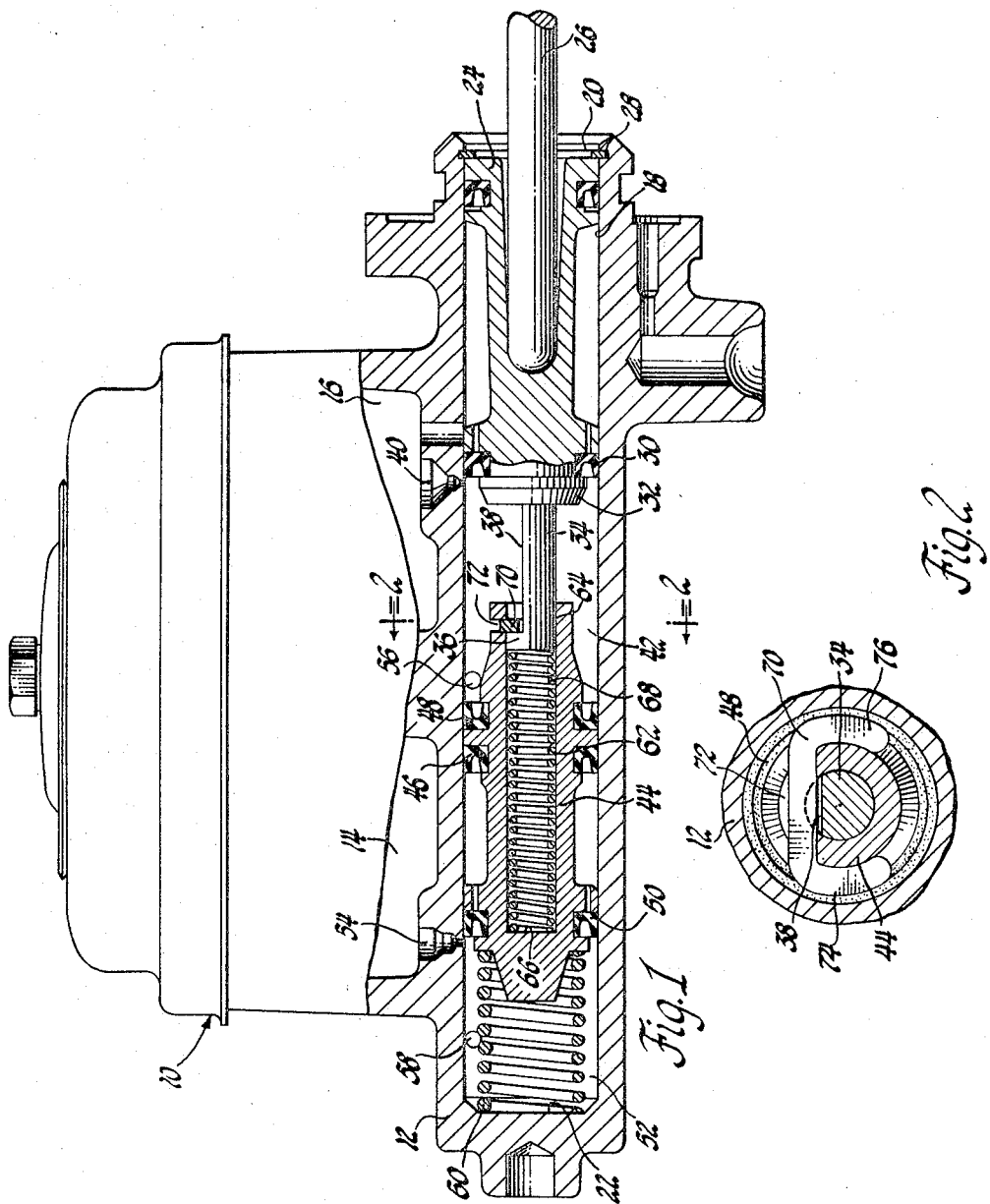

3,332,240
SPLIT MASTER BRAKE CYLINDER
William E. Rise, Grosse Pointe Farms, Mich., assignor to General Motors Corporation, Detroit, Mich., a corporation of Delaware
Filed Oct. 18, 1966, Ser. No. 587,536
2 Claims. (Cl. 60—54.6)

ABSTRACT OF THE DISCLOSURE

A master cylinder for pressurizing brake fluid in two separate chambers has a bore containing two pressurizing pistons in tandem relation. The pistons are joined by a lost motion connection which limits relative separating movement of the pistons and yieldingly resists relative piston closing movement. The structure comprising the connection is part of and/or contained in one or both of the pistons.

---

The invention relates to a master cylinder and more particularly to a dual master cylinder having separate pressurizing chambers for pressurizing brake fluid connected to separate brake lines. It especially relates to the arrangement of primary and secondary pistons in the master cylinder and means connecting and controlling relative movement of the pistons during brake actuation and release. The mechanism embodying the invention includes the provision of lost motion connection means joining the two pistons which positively limits relative separating movement of the pistons and yieldingly resists relative closing movement of the pistons. The particular lost motion connection means is provided within a bore formed in the secondary piston and includes a headed primary piston extension reciprocably received within the secondary piston bore, a suitable stop or retainer extending into the secondary piston bore adjacent the end through which the primary piston extension is received and limiting outward movement of the extension relative to the secondary piston, and a preloaded compression spring in the secondary piston bore acting to urge the primary and secondary pistons in relative separating movement. A piston return spring is also provided which directly acts on the secondary piston and has a lesser preload than the lost motion connection spring. A stop for the primary piston will position the primary piston in a precise retracted position and the lost motion connection means will position the secondary piston in a precise retracted position relative to the primary piston, and the piston return spring will act directly on the secondary piston and through the heavier preloaded spring of the lost motion connection means to the primary piston. This precise positioning will permit the compensating ports to be uncovered by the pressurizing cups of the primary and secondary pistons, and will also permit these ports to be closed on brake actuating movement of the pistons. While previous dual master cylinders have utilized a lightly preloading spring to act through a heavier preloaded spring to position both pistons, the heavier preloaded spring has been provided as a caged spring extending about an adjustable screw, usually connected to the primary piston, requiring spring retainers which usually must be separate parts. The invention now disclosed and claimed improves on the operational advantages of the adjustable screw caged spring arrangement while lowering the cost and simplifying the assembly thereof.

In the drawing:
FIGURE 1 shows a master cylinder embodying the invention, with parts broken away and in section.

FIGURE 2 is a fragmentary cross section view of the retaining means forming a portion of the structure of FIGURE 1 and taken in the direction of arrows 2—2 of that figure.

The dual master cylinder 10 includes a housing 12 which is formed to provide fluid reservoirs 14 and 16. The housing has a bore 18 with the rear end 20 being open and the forward end 22 being closed. A primary piston 24 is engaged by a push rod 26, through which the master cylinder may be actuated, and is reciprocably received in the bore 18. When the primary piston is in the retracted position shown in the drawing, it engages the stop 28, which may be a snap ring provided in a suitable groove at the rear end 20 of the bore 18. The primary piston has a pressurizing cup 30 adjacent its forward end. An abutment 32 is positioned immediately forward of cup 30 and an extension 34 is formed as a part of the piston 24 and extends forwardly from abutment 32. The extension is provided with a head or shoulder 36 on its extreme forward end. This may be constructed by providing a chordal undercut 38 on one side of the extension between the abutment 32 and the head 36. When the primary piston 24 is in the retracted position shown, the cup 30 clears the compensating port 40, which connects the reservoir 16 with the primary pressurizing chamber 42. This chamber is formed by the bore 18 and the forward end of piston 24 and the rearward end of a secondary piston 44.

The secondary piston 44 is reciprocably received in bore 18 forwardly of the primary piston 24. It has rear seals 46 and 48, with seal 48 serving to seal the forward end of the primary pressurizing chamber 42. Piston 44 has a pressurizing cup 50 adjacent its forward end. This cup and the forward end of piston 44 cooperate with the bore 18 to define the secondary pressurizing chamber 52, with the forward end 22 of the bore forming the forward wall of the chamber. When the secondary piston is in the retracted position shown, the secondary pressurizing cup 50 clears the compensating port 54, which interconnects reservoir 14 and pressurizing chamber 52. Outlet ports 56 and 58 are respectively provided for chambers 42 and 52 so that fluid pressurized therein may be conducted to suitable circuits. A piston return spring 60 acts on bore end 22 and on the forward end of piston 44 to urge that piston in the retracted direction.

Piston 44 has a bore 62 formed therein with an open end 64 and a forward closed end 66. The head 36 of primary piston extension 34 is reciprocably received within the bore 62, and a preloaded compression spring 68 is contained within the bore 62 and acts against the bore end 66 and the extension head 36, urging the extension head outwardly of the bore. A retainer 70 is secured to the secondary piston adjacent the bore open end 64 and intersects the bore so that it is engageable by the extension head 36 and limits outward movement of the extension head. The retainer 70 is preferably mounted in a chordally extending slot 72 formed in piston 44 and intersecting piston bore 62. The retainer has a body section received in the slot 72 and spring biased retaining ends 74 and 76 extending arcuately about the secondary piston 44 beyond a diameter thereof and thereby releasably holding the retainer in place. The pistons may be readily assembled as a unit by inserting spring 68 in the secondary piston bore 62, inserting the primary piston extension 34 into the bore 62 to compress spring 68 until head 36 moves forwardly of slot 72, and clipping the retainer 70 in place. The remainder of the master cylinder may be then assembled by inserting spring 60 in the forward end of bore 22, installing the primary and secondary pistons, and preloading spring 60 sufficiently to permit the installation of the snap ring 28.

When the brake system to which the master cylinder 10 is connected operates normally, the push rod 26 is actuated to move the primary piston 24 forwardly. Since spring 68 has a higher preload than spring 60, spring 60 will yield first so that both pistons move together until the compensating ports 40 and 54 are closed by cups 30 and 50. Pressure will then begin to build up in chamber 52, and spring 68 will yield under continued actuating force exerted through push rod 26 so that pressure will also build up in chamber 42. When the actuating force on push rod 26 is released, springs 60 and 68 will expand, with spring 68 urging the pistons in relative separating movement until the extension head 36 engages the retainer 70. Spring 60 will move the pistons rearwardly until piston 24 engages stop 28, with spring 68 being fully expanded within the limits of bore end 66 and extension head 36.

If the push rod 26 is actuated and fluid cannot be pressurized in chamber 42, for example, the pistons 24 and 44 will move forwardly until pressure is generated in chamber 52. Spring 68 will then yield as the actuating force is increased, the pressure slightly building up in chamber 52 in accordance with the difference in the spring rates of springs 60 and 68, until the primary piston abutment 32 engages the rear end of secondary piston 44. This will provide a direct force-transmitting connection to the secondary piston from the primary piston and will permit fluid to be pressurized in chamber 52 by the direct application of force from push rod 26. If pressure can be generated in chamber 42 but not in chamber 52, the secondary piston 44 will move forwardly until the forward end thereof engages bore end 22, with spring 60 yielding to permit this. Piston 44 will then be stationary, and further forward movement of piston 24 will result in pressurization of fluid in chamber 42.

I claim:
1. A dual master cylinder assembly comprising:
   a primary piston,
   a secondary piston,
   a return spring for said pistons,
   lost motion connection means joining and limiting relative separating movement of said pistons and yieldingly resisting relative closing movement of said pistons and including
   a bore in said secondary piston,
   an extension on said primary piston having a head reciprocably received in said bore,
   a spring on said bore urging said extension head out of said bore,
   and means retaining said extension head in said bore and comprising a slot in said secondary piston intersecting said bore and a retainer having a body section in said slot and said bore engageable by said extension head and another section securing said retainer to said secondary piston.

2. The assembly of claim 1,
   said spring on said bore having an extended preload greater than the extended preload of said return spring,
   and said retainer securing sections being spring biased retaining ends extending about circumferential portions of said secondary piston beyond a diameter thereof and releasably holding said retainer in place.

References Cited

UNITED STATES PATENTS

| | | | |
|---|---|---|---|
| 1,943,886 | 1/1934 | Carroll | 60—54.6 |
| 2,732,918 | 1/1956 | Hackworth | 60—54.6 |
| 2,992,533 | 7/1961 | Hodkinson | 60—54.6 X |
| 3,147,596 | 9/1964 | Wallace | 60—54.6 |
| 3,149,468 | 9/1964 | Shutt | 60—54.6 |

FOREIGN PATENTS

| | | |
|---|---|---|
| 1,298,741 | 6/1962 | France. |
| 887,631 | 1/1962 | Great Britain. |

MARTIN P. SCHWADRON, *Primary Examiner.*

ROBERT R. BUNEVICH, *Examiner.*